(12) United States Patent
Sagawa

(10) Patent No.: US 7,432,877 B2
(45) Date of Patent: Oct. 7, 2008

(54) COMMUNICATION TERMINAL DEVICE

(75) Inventor: Yuichiro Sagawa, Saitama (JP)

(73) Assignee: NEC Corporation (JP)

( * ) Notice: Subject to any disclaimer, the term of this patent is extended or adjusted under 35 U.S.C. 154(b) by 752 days.

(21) Appl. No.: 10/962,658

(22) Filed: Oct. 13, 2004

(65) Prior Publication Data

US 2005/0093828 A1 May 5, 2005

(30) Foreign Application Priority Data

Oct. 30, 2003 (JP) ............................. 2003-370646

(51) Int. Cl.
*H04M 1/00* (2006.01)
(52) U.S. Cl. ..................... 345/1.2; 345/1.1; 345/169; 345/204; 455/550; 455/556; 455/566; 455/575
(58) Field of Classification Search ................. 345/1.1, 345/1.2, 84, 158, 169, 204; 455/550, 556, 455/557, 566, 575
See application file for complete search history.

(56) References Cited

U.S. PATENT DOCUMENTS

| 3,999,175 | A | * | 12/1976 | Thibodeau ................... 340/644 |
| 5,795,301 | A | * | 8/1998 | Yasukawa et al. ........... 600/500 |
| 6,069,593 | A | * | 5/2000 | Lebby et al. ................. 345/1.1 |
| 2003/0092467 | A1 | | 5/2003 | Masuda et al. |
| 2003/0128174 | A1* | | 7/2003 | Scheibe ....................... 345/83 |
| 2003/0144036 | A1* | | 7/2003 | Ito ............................... 455/566 |
| 2004/0150596 | A1* | | 8/2004 | Uchida et al. ................ 345/84 |
| 2005/0253773 | A1* | | 11/2005 | Sekiguchi ................... 345/1.1 |

FOREIGN PATENT DOCUMENTS

| EP | 1 244 275 | 9/2002 |
| JP | 10-129300 | 5/1998 |
| JP | 10-307563 | 11/1998 |
| JP | 2001-274880 | 10/2001 |
| JP | 2001-296507 A | 10/2001 |
| JP | 2002-209001 | 7/2002 |
| JP | 2002 209001 | 7/2002 |
| JP | 2002-281130 | 9/2002 |

OTHER PUBLICATIONS

European Search Reported issued Feb. 15, 2005.

* cited by examiner

*Primary Examiner*—Bipin Shalwala
*Assistant Examiner*—Vince E Kovalick
(74) *Attorney, Agent, or Firm*—Dickstein, Shapiro, LLP.

(57) ABSTRACT

A portable terminal device according to the present invention, for example a cellular phone, comprises a plurality of liquid crystal displays (LCDs) and a display switching controller. When the main LCD is out of order, the controller causes information that is to be displayed on the LCD, to be displayed on another LCD. The portable terminal device can comprise a malfunction detection unit for detecting a malfunction in the main LCD. The detection unit verifies data to be displayed in a driver circuit, or detects a current value in the circuit. The controller controls display on a basis of a signal from the detection unit. Information to be caused to be displayed on another LCD can be set in advance, or can be set by a user.

7 Claims, 6 Drawing Sheets

COMMUNICATION TERMINAL DEVICE

BACKGROUND OF THE INVENTION

1. Field of the Invention

The present invention relates to a communication terminal device. Specifically, the present invention relates to a communication terminal device which has a plurality of displays, and wherein, if a particular display is out of order, parts or all of the contents to be displayed on the display are displayed on another display.

2. Description of the Related Art

Recently, a cellular phone has a number of functions. A user of a cellular phone can use various functions such as transmission and reception of an e-mail, schedule management, and Internet connection. For this reason, a display of a cellular phone displays various pieces of, and a large amount of, information. To meet such a request, Japanese Patent Laid-open No. 2002-209001 has disclosed a cellular phone constituted of a single housing having two liquid crystal displays. A cellular phone of this type has a keypad and a liquid crystal display on each of the front and the rear. The keypad in the front includes keys mainly for numerical entries. The keypad in the rear includes keys mainly for character entries. A user can sufficiently employ a number of functions which a cellular phone has by use of the two displays.

On the other hand, foldable cellular phones having two liquid crystal displays are widely used. A first liquid crystal display of the two is arranged in the inside of one housing of a cellular phone. The first display can been seen with the flip open. In addition, the display is large in size, thereby enabling much information to be displayed. The second liquid crystal display of the two is arranged in the outside of a housing of the cellular phone. When the foldable cellular phone is being closed, the user can use the second liquid crystal display. In general, the second liquid crystal display is smaller in size than the first liquid crystal display is. Accordingly, information items and contents which can be displayed thereon are limited. For this reason, when the first liquid crystal display is out of order and cannot display information, the user cannot employ functions such as transmission and reception of an e-mail, schedule management, and Internet connection fully. For example, in a case where the user cannot access a telephone directory, it is an equivalent to the loss of a function of the cellular phone.

SUMMARY OF THE INVENTION

A communication terminal device according to the present invention comprises: a key entry unit, a plurality of displays, and a display switching controller for causing one or more of the contents to be displayed on a predetermined display to be displayed on another display. The communication terminal device can comprise a malfunction detector for detecting a malfunction in the predetermined display, and for informing the display switching controller of it. The communication terminal device can comprise a display switching operation unit for causing one or more of the contents to be displayed on a predetermined display to be displayed on another display. The display switching operation unit is operated by a user of the communication terminal device.

In the aforementioned communication terminal device, even when the larger liquid crystal display usually in use is put out of order, the user can access needed information through another display.

BRIEF DESCRIPTION OF THE DRAWINGS

The above and other objects, features and advantages of the present invention will become apparent from the following detailed description when taken with the accompanying drawings in which.

DETAILED DESCRIPTION OF THE PREFERRED EMBODIMENTS

Figure 1:
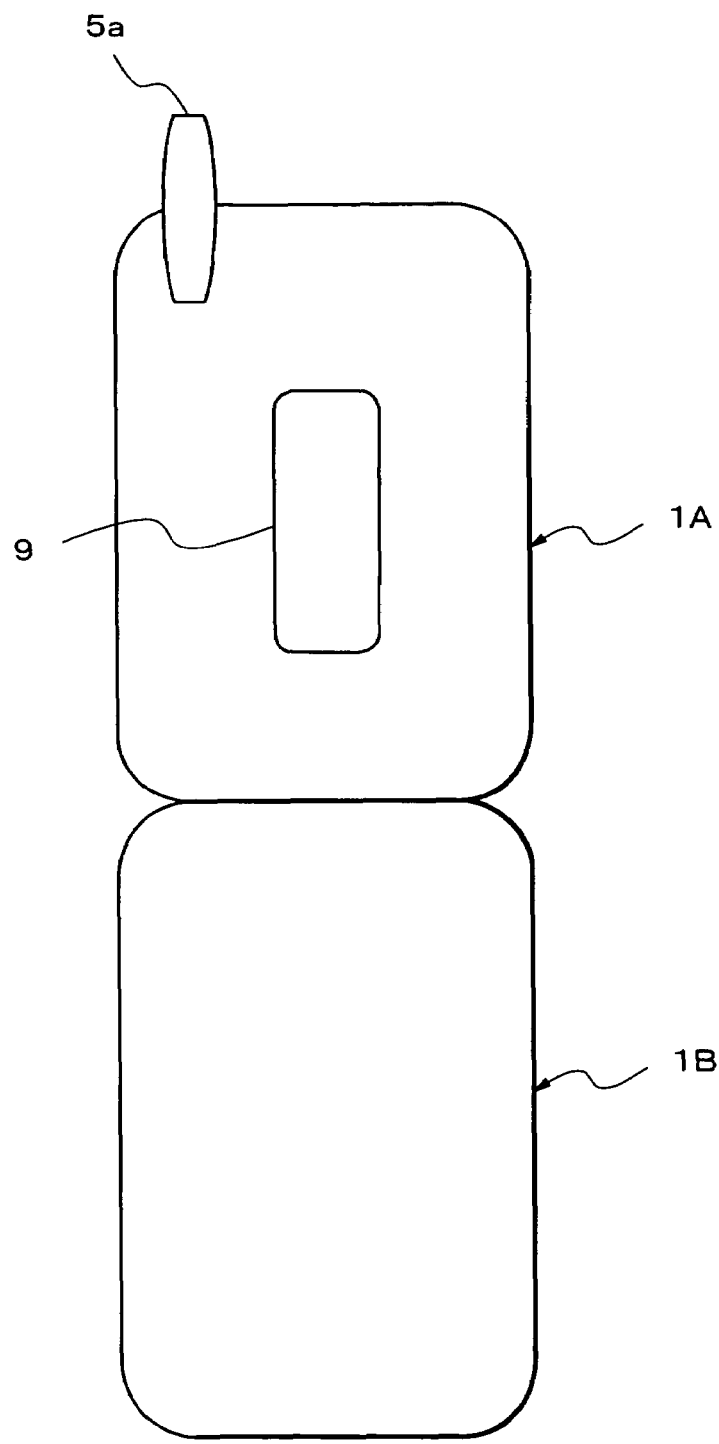
FIG. 1 shows a view of the outer surface of a foldable portable terminal device according to an embodiment of the present invention.
Figure 2:
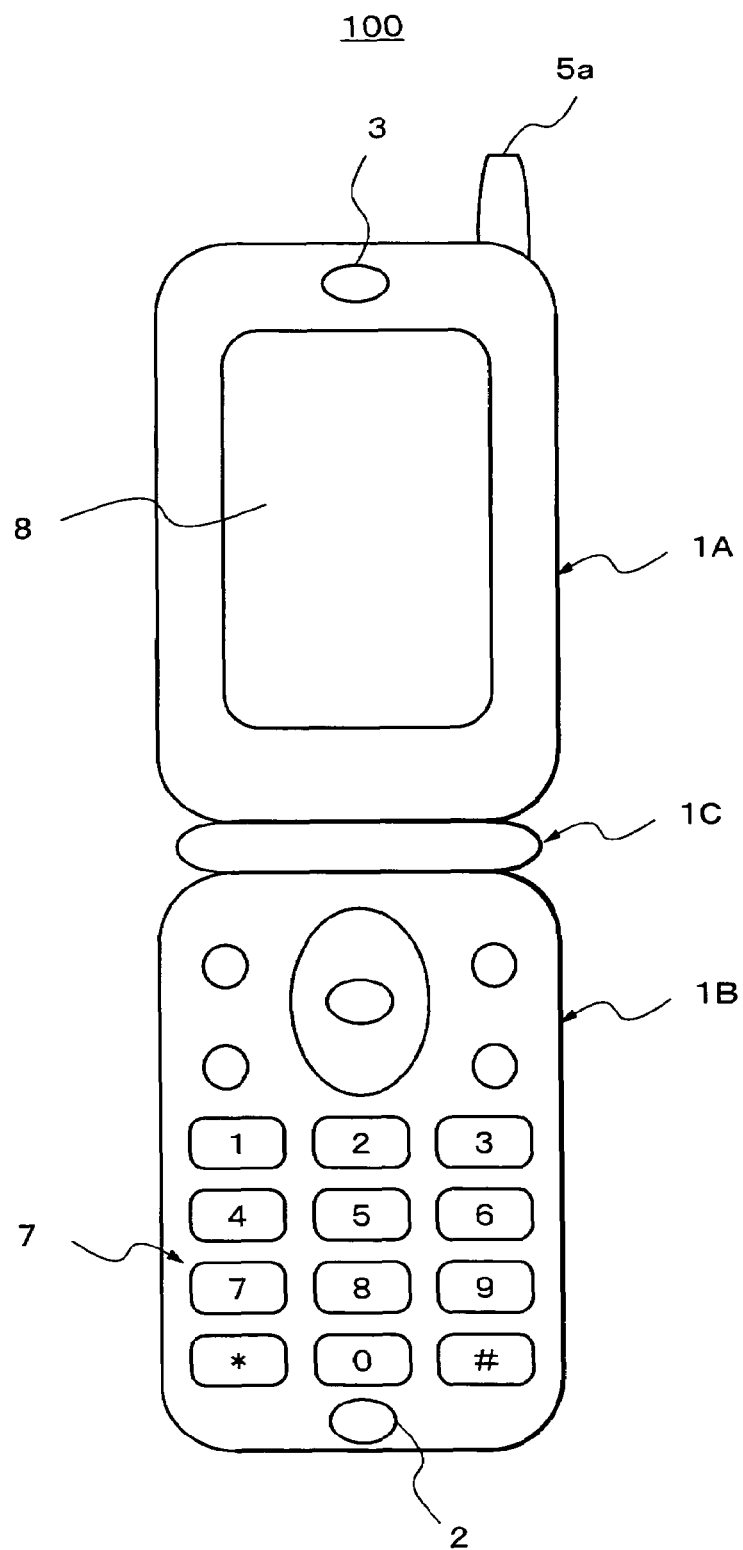
FIG. 2 shows a view of the inner surface of a foldable portable terminal device according to the embodiment of the present invention.

A description will be provided below for preferred embodiments of a portable terminal device according to the present invention. With reference to FIG. 1, a foldable cellular phone 100, which is a specific example of a portable terminal device, comprises a first housing 1A, a second housing 1B, a second liquid crystal display (LCD) 9 and an antenna 5a. FIG. 1 shows the outer surface of the foldable cellular phone 100 (or the surface arranged outside with the flip closed). FIG. 2 shows the inner surface of the foldable cellular phone 100. In other words, with the flip closed, the inner surface is positioned inside the cellular phone, and cannot be seen from outside. The inner surface of the first housing 1A includes a first liquid crystal display (LCD) 8 and a speaker 3. The inner surface of the second housing 1B includes a key entry unit 7 and a microphone 2. A hinge portion 1C foldably connects the first and second housings. This cellular phone 100 can include functions such as talk, transmission and reception of an e-mail, Internet connection, schedule management, telephone directory management, calculation and the like. The first liquid crystal display 8 is larger than the second liquid crystal display 9, and displays information concerning various functions mentioned above and a telephone number registered in the telephone directory.

Figure 3:
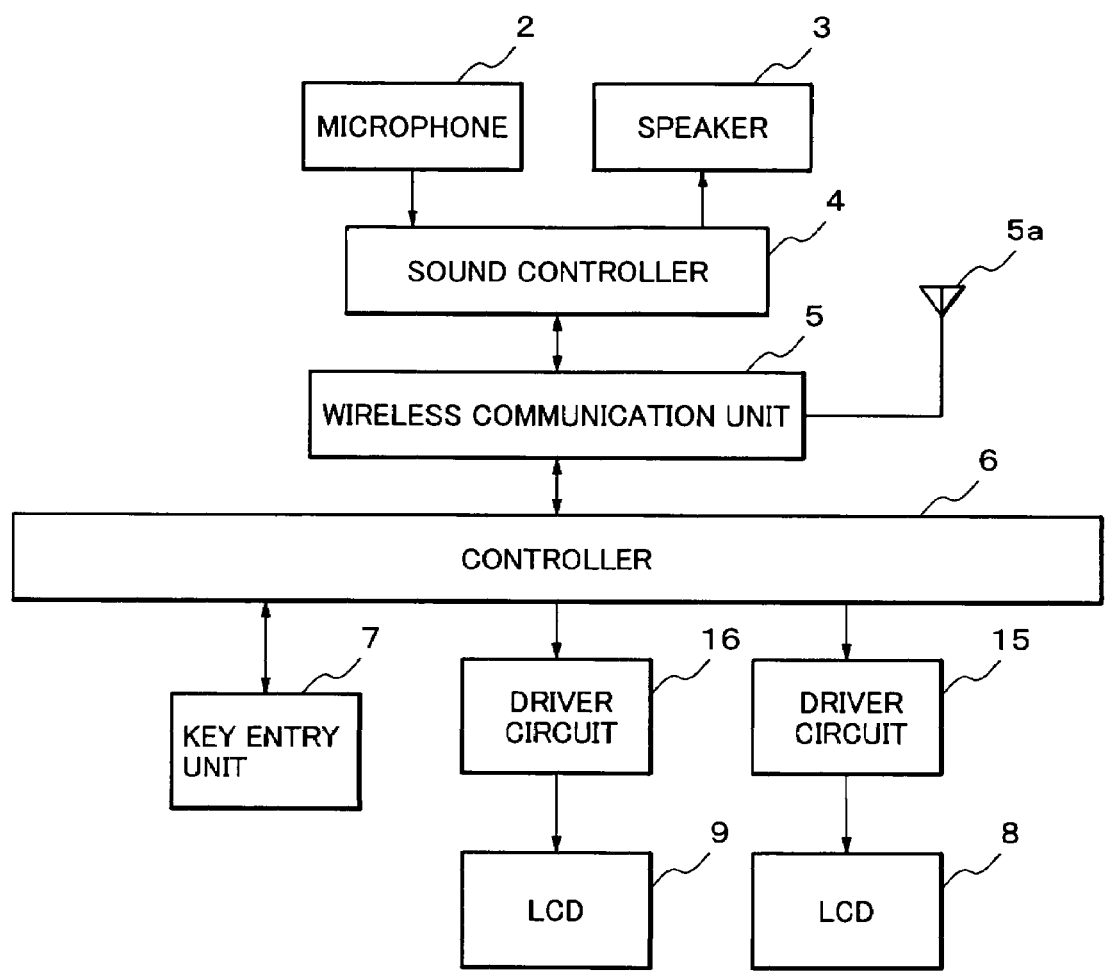
FIG. 3 is a block diagram of a cellular phone according to a first embodiment of the present invention.

FIG. 3 is a block diagram of a cellular phone 100 according to a first embodiment of the present invention. The cellular phone 100 comprises a sound controller 4, a wireless communication unit 5, a controller 6 and a key entry unit 7. The sound controller 4 is connected to a microphone 2 and a speaker 3. The controller 6 is connected to LCDs 8 and 9 through driver circuits 15 and 16. The sound controller 4 transmits a sound signal to, and receives a sound signal from, the wireless communication unit 5, and controls the microphone 2 and the speaker 3. The wireless communication unit 5 includes an antenna 5a, and controls wireless communications between the cellular phone 100 and a wireless communication base station. The controller 6 is a CPU, and controls the wireless communication unit 5, the first and second liquid crystal displays 8 and 9. Practically, the controller 6 controls the first liquid crystal display 8 through the driver circuit 15, and controls the second liquid crystal display 9 through the driver circuit 16. The controller 6 includes, for example, a ROM storing various programs and various data needed for executing programs as well as a RAM having a storage area for storing various data temporarily and a working area of a CPU. The controller 6 can control various programs, for example, a function of managing a schedule and a function of performing a calculation. The key entry (input) unit 7 transmits to the controller 6 various pieces of information which a user has inputted through key operations of a key or more.

Furthermore, the controller 6 includes a function of detecting, for example, whether or not the first liquid crystal display 8 is out of order. Specifically, a malfunction in the first liquid crystal display 8 is judged by detecting whether or not the driver circuit 15 is out of order. The controller 6 transmits to the driver circuit 15 a display control signal and data to be displayed on the first liquid crystal display 8. The data is once stored in the memory of the driver circuit 15. Subsequently, the driver circuit 15 transmits to the first liquid crystal display 8 the data which has been stored in the memory of the driver circuit 15, thereby causing a predetermined piece of information to be displayed on the display 8. The driver circuit 15 returns the aforementioned data to the controller 6. The controller 6 verifies returned data to be displayed. Specifically, the controller 6 keeps holding data to be displayed which is to be transmitted to the driver circuit 15 until the verifying is completed, and compares the held data to be displayed with the displayed data which has been returned from the driver circuit 15. Incidentally, in some cases, it takes long time to verify all the data. For this reason, it is preferable that data are sampled and the sampled data is verified.

If the held data to be displayed and the displayed data which has been returned are not consistent with each other, the controller 6 judges that the driver circuit 15 is out of order, or that the first liquid crystal display 8 cannot display the data in a normal manner. At this time, the controller 6 performs a control in order to display on the second liquid crystal display 9 parts or all of the information (i.e. data) to be displayed on the first liquid crystal display 8. Specifically, information which a user needs in case of emergencies, for example, an e-mail function, a telephone directory function and procedures for making a backup in an external memory, is displayed on the second liquid crystal display 9 with priority given. Information to be displayed on the second liquid crystal display 9 can be set in advance. Or else, information to be displayed on the second liquid crystal display 9 can be set selectively through key operation by a user. In a case where the selective setting can be performed, a user can set information selectively in advance, for example, while the first liquid crystal display 8 is in order. Or else, after the first liquid crystal display 8 runs out of order, a user can cause a selective setting screen to be displayed on the second liquid crystal display 9, thereby setting contents to be displayed in a selective manner. In addition, the driver circuit 16 can be designed not to have a function of returning data to the controller 6. In a cellular phone according to the aforementioned embodiment, a user can access important information or information needed in case of emergencies quickly, even when the first liquid crystal display, large in size, which is arranged in the inner side, runs out of order.

Figure 4:
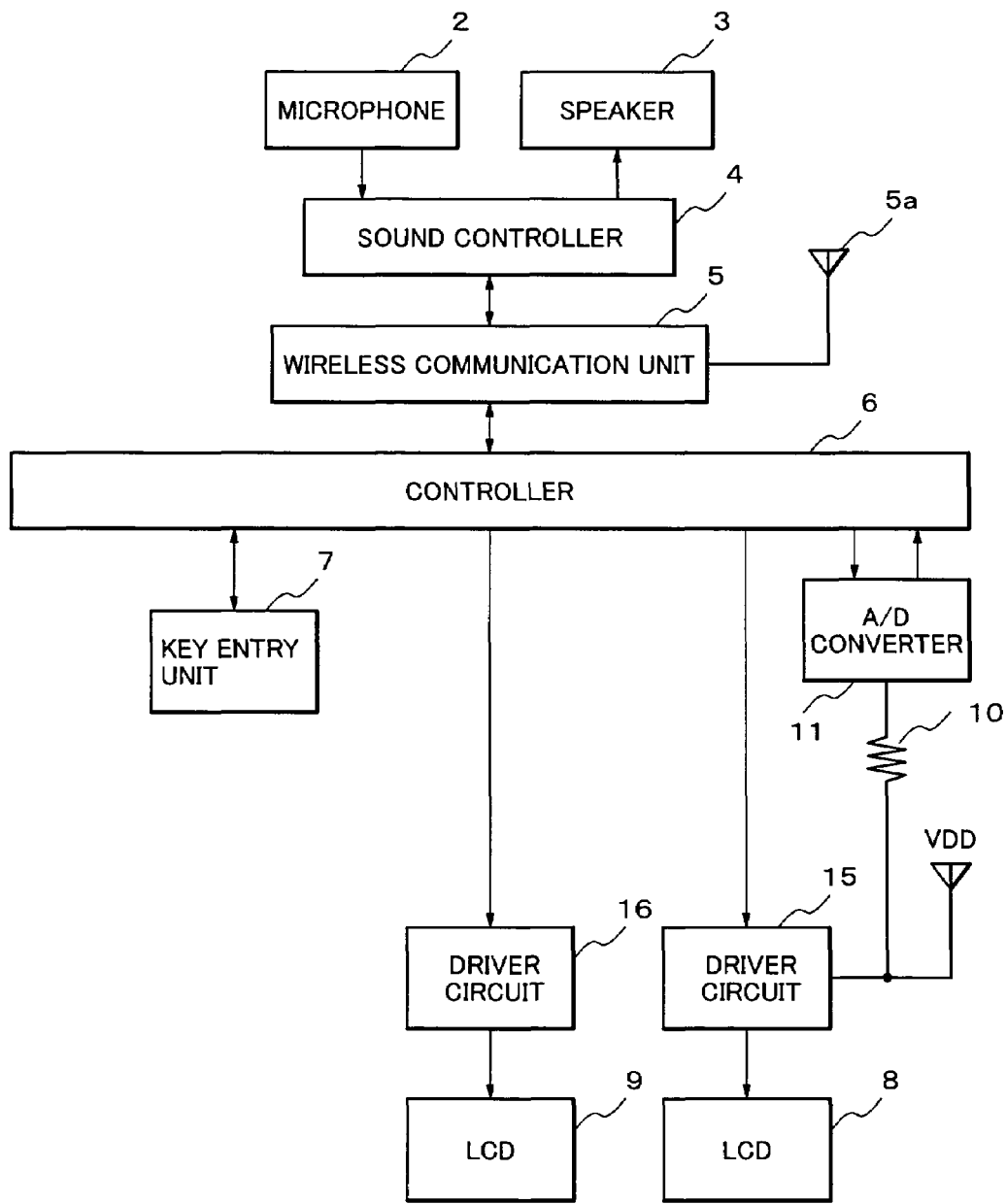
FIG. 4 is a block diagram of a cellular phone according to a second embodiment of the present invention.

FIG. 4 is a block diagram of a cellular phone 200 according to a second embodiment of the present invention. In this cellular phone 200, a value of current in a driver circuit 15 is monitored. This cellular phone 200 comprises the same basic configuration as the cellular phone 100 shown in FIG. 3 does, and additionally comprises a resistor 10 for converting voltage into current (a resistance value is, for example, 1 ohm) and an A/D converter 11 for converting the current value from analogue to digital. The A/D converter 11 converts the current value from analogue to digital at predetermined time intervals by control of the controller 6, and transmits the current value to the controller 6. The controller 6 compares the value received from the A/D converter 11 with predetermined upper and lower limit values, and determines whether or not the received value is within a range designated by these two values. If the received value is outside the range, the controller 6 judges that the driver circuit 15 is out of order.

Figure 5:
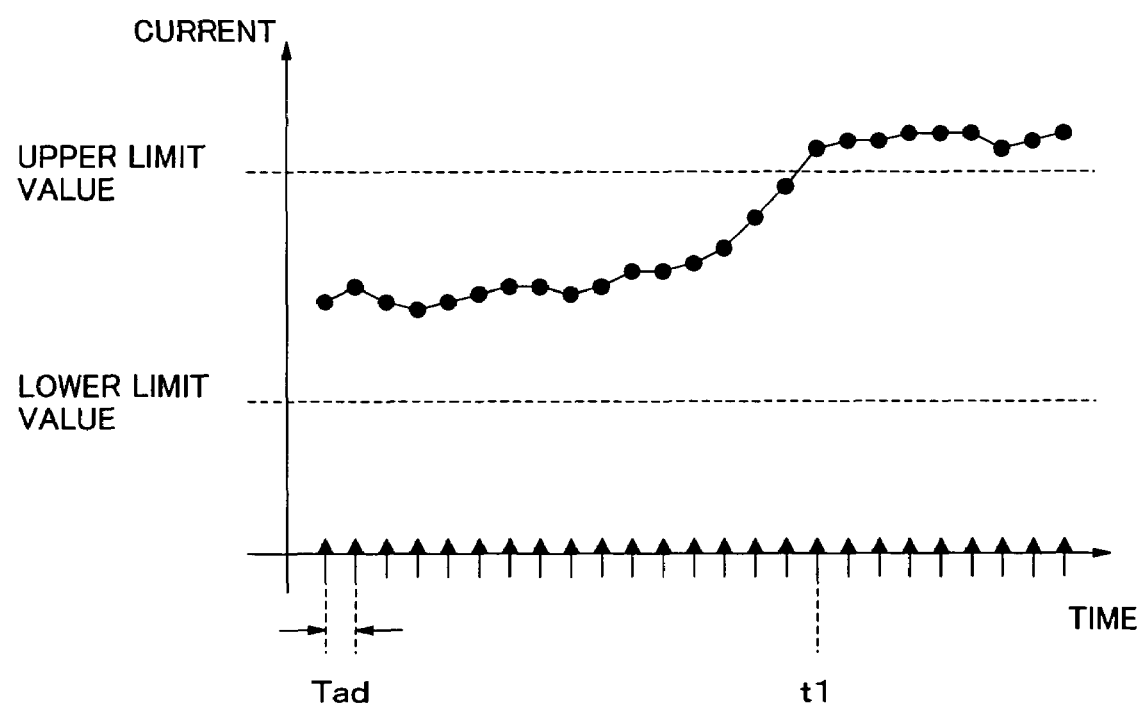
FIG. 5 is a graph showing an operation of the cellular phone according to the second embodiment of the present invention.

FIG. 5 shows an example of an operation of judging a malfunction in the cellular phone 200. The A/D converter 11 converts a current value from analogue to digital at predetermined time intervals (Tad), and transmits the converted value to the controller 6. The controller 6 determines whether or not the value is between predetermined upper and lower limit values. In this case, the value converted from analogue to digital exceeds the upper limit value at a time t1. At this time, the controller 6 judges that the driver circuit 15 is out of order. In this point, the controller 6 performs a control for displaying on the second liquid, crystal display 9 parts or all of the information which is to be displayed on the first liquid crystal display 8. In the cellular phone 200 of the second embodiment, all of the same operations as have been described for the cellular phone 100 can be performed. An operation of detecting a current value in the cellular phone 200 can judge a malfunction of the driver circuit 15 in a shorter time in comparison with the verifying of data, which has been described above.

Figure 6:
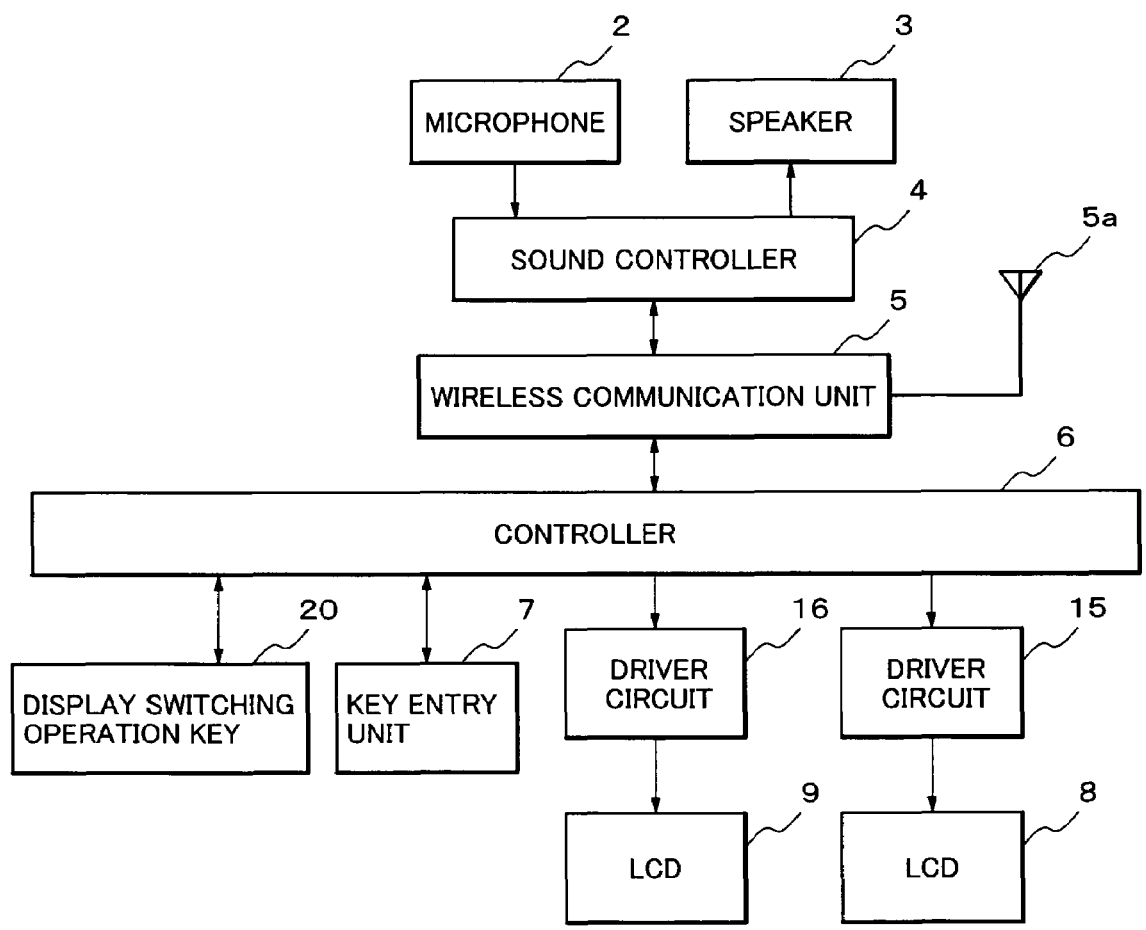
FIG. 6 is a block diagram of a cellular phone according to a third embodiment of the present invention.

FIG. 6 is a block diagram of a cellular phone 300 according to a third embodiment of the present invention. This cellular phone 300 has the same basic constitution as the cellular phone 100 shown in FIG. 3 does. This cellular phone 300 further comprises a display switching operation key 20. A user of the cellular phone 300 operates the display switching operation key 20, in a case where the user notices that a first liquid crystal display 8 of the cellular phone 300 is out of order. Then, a controller 6 causes parts or all of the information, which is to be displayed on a first liquid crystal display 8, to be displayed on a second liquid crystal display 9. The display switching operation key 20 can be an independent key. Or else, a key entry unit 7 can have a display switching function. In this case, the display switching function can be realized by operation of a plurality of keys. A user can perform the switching of displays as described above even if the first liquid crystal display 8 is not out of order. The controller 6 of the cellular phone 300 according to the third embodiment does not have to have a function of judging a malfunction in a driver circuit. The controller 6 having the function of judging a malfunction can issue a warning (for example, sounds, a warning display on a second liquid crystal display 9, or light emission from a light emitting indicator) to inform that a malfunction has occurred to the first liquid crystal display 8.

The portable terminal device according to the present invention can have three displays or more. In this case, when one of the displays runs out of order, information needed can be displayed on another, or two or more other liquid crystal displays. Displays are not limited to being liquid crystal displays, and organic LE can be used for the displays. The portable terminal device according to the present invention can be a terminal device such as a PDA (personal digital assistant) and a PHS (personal handyphone system) in addition to being the cellular phone.

While the present invention has been described in connection with certain preferred embodiments, it is to be understood that the subject matter encompassed by the present invention is not limited to those specific embodiments. On the contrary, it is intended to include all alternatives, modifications, and equivalents as can be included within the spirit and scope of the following claims.

What is claimed is:

1. A communication terminal device comprising:
a key entry unit;
a plurality of displays;
a display switching controller for causing one or more contents that are to be displayed on a predetermined display, to be displayed on another display; and
a malfunction detection unit for detecting a malfunction in the predetermined display, and for informing the display switching controller of it,
wherein the display switching controller operates upon reception of the information, and
wherein the malfunction detection unit judges a malfunction in the predetermined display by verifying data to be displayed.

2. The communication terminal device according to claim 1,
comprising a display operation controller for controlling an operation of the display,
wherein the display operation controller transmits the data to be displayed to the malfunction detection unit.

3. The communication terminal device according to claim 1, wherein parts of the displayed data are verified.

4. A communication terminal device comprising:
a key entry unit;
a plurality of displays;
a display switching controller for causing one or more contents that are to be displayed on a predetermined display, to be displayed on another display;
a malfunction detection unit for detecting a malfunction in the predetermined display, and for informing the display switching controller of it; and
a display operation controller for controlling an operation of the display,
wherein the display switching controller operates upon reception of the information, and
wherein the malfunction detection unit detects at least one of a current value and a voltage value in the display operation controller, thereby judging a malfunction in the predetermined display.

5. The communication terminal device according to claim 4, wherein the malfunction detection unit performs an detection operation at predetermined time intervals.

6. A communication terminal device comprising:
a key entry unit;
a plurality of displays;
a display switching controller for causing one or more contents that are to be displayed on a predetermined display, to be displayed on another display; and
a malfunction detection unit for detecting a malfunction in the predetermined display, and for informing the display switching controller of it,
wherein the display switching controller operates upon reception of the information, and
wherein the display switching controller and the malfunction detection unit are formed in a CPU.

7. A communication terminal device comprising:
a key entry unit;
a plurality of displays; and
a display switching controller for causing one or more contents that are to be displayed on a predetermined display, to be displayed on another display; and
a display switching operation unit for causing one or more of the contents, which are to be displayed on the predetermined display, to be displayed on another display,
wherein the display switching controller switches displays upon receipt of a signal from the display switching operation unit, and
wherein the key entry unit includes the display switching operation unit.

* * * * *